United States Patent

[11] 3,601,266

| [72] | Inventors | Florentin J. Pearne<br>Whittier;<br>Frank S. Pearne, San Gabriel; Frederick G. Robson, Long Beach, all of, Calif. |
|---|---|---|
| [21] | Appl. No. | 818,240 |
| [22] | Filed | Apr. 22, 1969 |
| [45] | Patented | Aug. 24, 1971 |
| [73] | Assignee | Aircraft Mechanics, Inc.<br>Los Angeles, Calif. |

[54] UNLOADER BLENDER
11 Claims, 6 Drawing Figs.

[52] U.S. Cl. .................................................. 214/8.5 C, 214/44
[51] Int. Cl. .............................................. B65g 59/02
[50] Field of Search .......................................... 214/8.5 C, 8.5 D, 6 M, 6 A, 44

[56] References Cited
UNITED STATES PATENTS

| 2,961,810 | 11/1960 | Johnson | 214/6 A X |
| 3,259,417 | 7/1966 | Chapman | 214/8.5 D X |
| 3,487,959 | 1/1970 | Pearne | 214/1 BZ X |

*Primary Examiner*—Gerald M. Forlenza
*Assistant Examiner*—George F. Abraham
*Attorney*—McNenny, Farrington, Pearne & Gordon ABSTRACT: An unloader blender is disclosed for handling bricks or the like. The unloader is operable to grip grids of brick from selected stacks of grids and transfer such grids to a platform. By programming the machine to sequentially grip and transfer grids from selected stacks it is possible to blend the bricks so that different types of brick are delivered to the platform in predetermined ratios of numbers. The machine also includes a second transfer for moving the bricks from the platform to a conveyor. Here again, blending is provided so that groups of brick delivered to the conveyor are not necessarily in the same order they appear on the platform. The grids include double superposed rows of brick and the second transfer operates to separate the upper and lower layers and delivers the brick to the conveyor as a single layer.

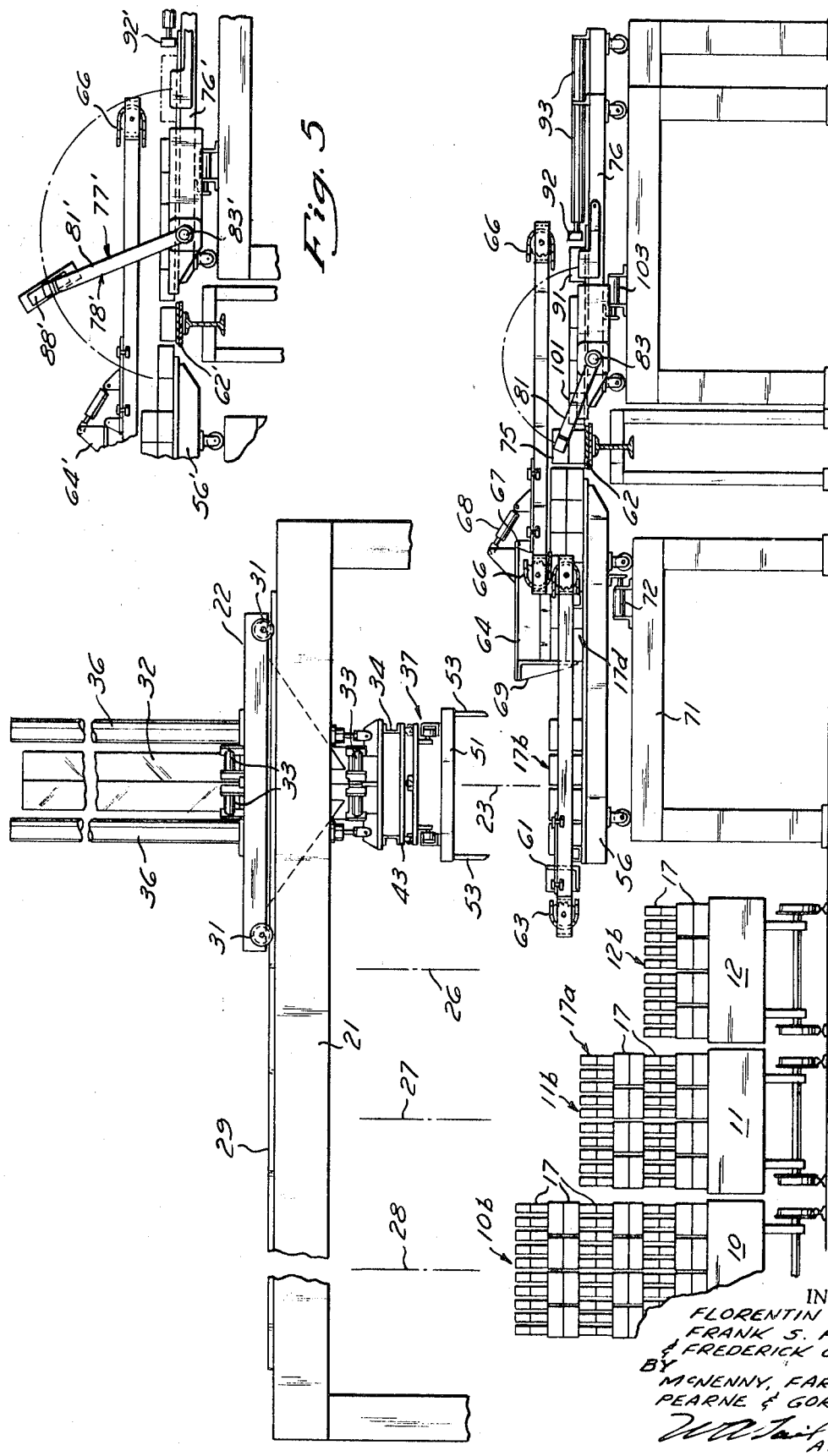

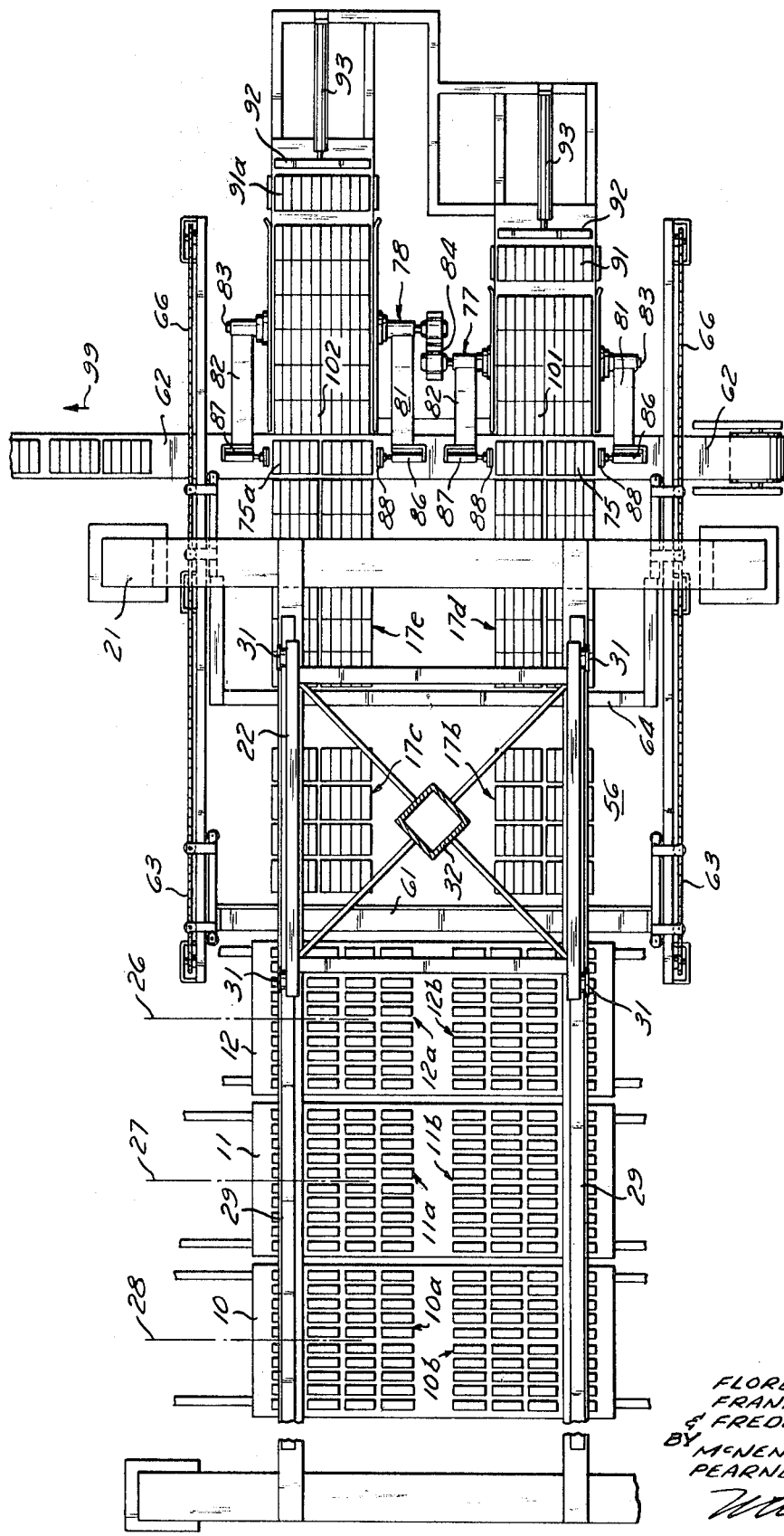

UNLOADER BLENDER

BACKGROUND OF INVENTION and PRIOR ART

This invention relates generally to unloader transfers for blocklike articles such as bricks or the like and more particularly to an unloader transfer which operates to blend the articles during its unloading operation.

Machines have been developed to automate the entire manufacture of bricks from the forming operation to the packaging for shipping and storage. The U.S. patent application Ser. No. 478,913, filed Aug. 11, 1965, now Pat. No. 3,478,397, discloses one automated cutter and hacker for forming brick and stacking the unfired brick on a kiln car in a predetermined pattern. The U.S. patent application Ser. No. 663,394, filed Aug. 25, 1967 now Pat. No. 3,487,959 discloses an automated unloader which removes the fired bricks of such stacks and places them on conveyors which deliver the brick to a packaging stacker. The U.S. patent application Ser. No. 616,125, filed Feb. 14, 1967 now Pat. No. 3,491,901 discloses a package stacker which operates to automatically form packaging stacks of bricks delivered to it by a conveyor. The stacks formed by this package stacker are suitable for delivery to a strapper which straps the stacks into a package for shipping and storage of the brick. All of these patent applications disclose machines which are compatible with each other and may be combined to provide a fully automated system for the manufacture and packaging of bricks.

The present invention is directed to the unloading of the fired brick from stacks on a kiln car or the like and is generally similar in function, and in certain structural aspects, to the unloader disclosed in Ser No. 663,394 (supra). However, the unloader in accordance with the present invention also functions to blend the brick during its operation.

It is often desirable to supply the bricks to the conveyor leading to the package stacker in a manner so that the package stack contains a predetermined blend of bricks of different physical properties of such as different colors or textures or the like. For example, it may be desirable to form a package of 500 bricks in which 100 bricks are of a first color or texture, another 100 bricks are of a second color or texture, and the remaining bricks are of a third color or texture. In such a package a blend is present of the three different types of bricks with each type representing a predetermined percentage of the total package.

In other instances, it may be desirable to form a package in which the package includes bricks arranged so that they are not positioned in the package in the same general sequence they are manufactured. In the automated manufacture, a particular group of sequentially manufactured bricks may have a slightly different color or texture than the preceding or subsequent group. Also bricks located in a particular part of a stack, during firing, may differ slightly from bricks located in another location in the stack. If such bricks are placed in the package in the same order they are manufactured or in the same grouping they are fired, there is a possibility that they will be laid up in their final use in a group which would form an area of a texture or color which is different than adjacent areas. On the other hand, if such bricks are blended or mixed as they are placed in the stack, a mixture or blend of the bricks is automatically achieved and this problem is eliminated.

SUMMARY OF INVENTION

The present invention is directed to an unloader transfer for use in the automated manufacture of bricks or the like which is operable to blend the bricks as they are delivered to the conveyor. Consequently, the bricks delivered by the conveyor leading to the stacker or the like are blended so that the final package contains the desired blend.

In the pending application Ser. No. 478,913 (supra) an automated brick cutter and hacker is disclosed which operates to form the brick and stack the unfired brick on a kiln car in a pattern in which grids are alternately positioned on the kiln car at right angles to the adjacent grids in each stack. Each grid consists of a plurality of spaced parallel double rows of superposed pairs of endwise aligned brick. The stacks of this type are particularly desirable since they are stable, permit the stacking of a large number of bricks on a single car, and result in relatively even burning of the brick.

The illustrated unloader blender, in accordance with the present invention, is operable to automatically remove bricks or the like from stacks of such grids and to transfer such bricks to a conveyor. The machine however, is also operable to blend the bricks delivered to the conveyor during such unloading operation. Two forms of blending are provided by the apparatus disclosed. The first blending involves a sequential removal of grids from different stacks. Such blending is particularly useful where one stack is formed of brick of one color or texture and another stack is formed of brick of another color or texture. With this apparatus it is possible to produce a package of brick having substantially any desired blend of bricks of different colors or textures.

The illustrated apparatus also provides secondary blending so that the bricks placed on the conveyor are not in the same sequence they were formed or fired during their manufacture. This blending insures that the bricks in the package are not maintained in the order of manufacture so that bricks of a particular color or texture will not appear in a single group in the package.

In accordance with still another facet of this invention a structure is provided wherein double layers of superposed brick are supplied to the machine and are separated in a manner arranged so that they are delivered to a single conveyor in a single layer.

It is an important object of this invention to provide a novel and improved blender unloader which is operable to automatically unload bricks from a kiln car or the like and to deliver such brick to a desired location, wherein the transfer automatically performs blending operations.

DESCRIPTION OF THE DRAWINGS

FIG. 1 is a side elevation of a blender and unloader incorporating this invention with certain parts broken away for purposes of illustration;

FIG. 2 is a plan view of the machine illustrated in FIG. 1;

FIG. 5 is a fragmentary side elevation of a second embodiment of inverter which is operable to invert two groups of bricks simultaneously.

Figure 3A:
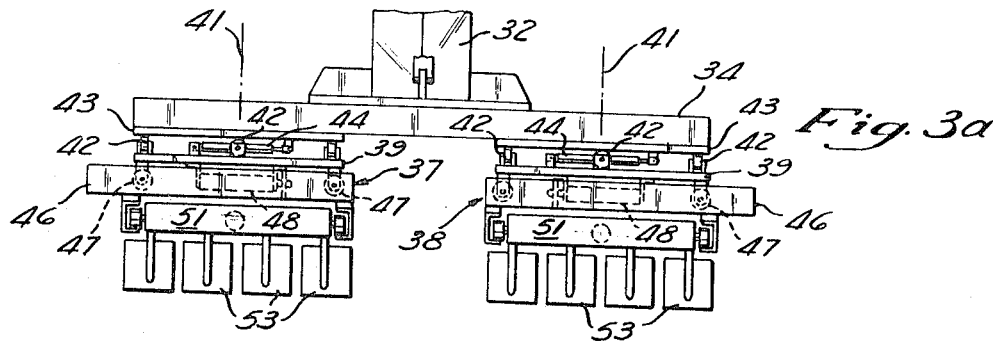
FIG. 3a is a fragmentary side elevation of the gripper transfer frames illustrating the frames in the separated position.

In the illustrated embodiment there are three kiln car 10 through 12 positioned in side-by-side relationship in the machine. Power means (not illustrated) are provided to move each kiln car to the position for unloading. Each kiln car in the illustrated embodiment supports two stacks of brick with the stacks 10a and 10b located on the kiln car 10, the stacks 11a and 11b are located on the kiln car 11, and the stacks 12a and 12b are located on the kiln car 12. Each of the stacks is similar in arrangement and consists of a plurality of grids 17. The grids each include a plurality of spaced double rows of superposed pairs of brick in endwise aligned relationship. The grids are arranged in each stack with the rows of each grid extending perpendicular to the rows of the adjacent grids. Reference may be made to the U.S. Pat. application Ser. No. 478,913 (supra) for a detailed description of how such grids are formed and stacked on a kiln car. This stack arrangement permits the loading of a large number of bricks on each kiln car in a stable stack in which the bricks are relatively evenly fired.

It should be understood that a machine incorporating this invention can be sized to receive more than three kiln cars and that the machine can be used to unload kiln cars having substantially any number of stacks loaded thereon.

The machine includes an overhead frame 21 which supports a horizontally movable carriage 22 for movement between a release station 23 and any one of three pickup stations 26, 27, or 28 (all indicated by centerline). The overhead frame 21 provides parallel tracks 29 to support the carriage in its horizontal movement. Rollers 31 on the carriage 22 ride along the track 29 to support the carriage during its movement. A suitable actuating mechanism (not illustrated) is connected to the carriage to power it in its movement along the track. Such a mechanism may, for example, include a chain drive or the like and suitable switches located to control the actuator mechanism for proper positioning of the carriage.

Mounted on the carriage 21 for vertical movement with respect thereto is a support column 32. Spaced rollers 33 carried by the carriage locate the column 32 with respect to the carriage while permitting vertical movement of the column. Mounted on the lower end of the column 32 is a support assembly 34. Piston and cylinder actuators 36 are connected between the carriage 22 and the support assembly 34 and provide the power for raising and lowering the column 32.

Figure 3B:
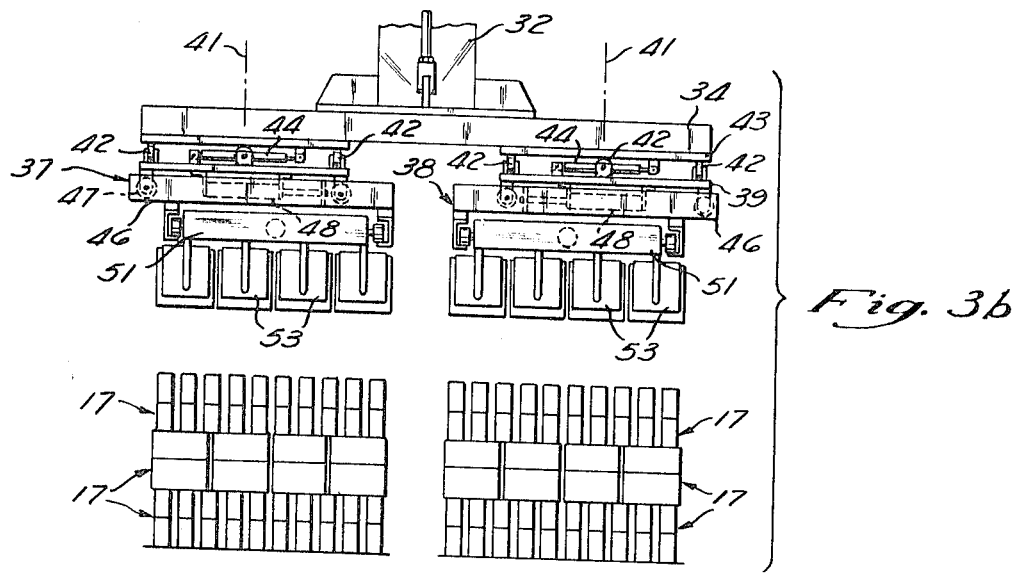
FIG. 3b is a fragmentary side elevation of the gripper transfer illustrated in FIG. 3a illustrating the gripper position after grids are gripped from two stacks and prior to separating movement of the grippers.

Referring to FIGS. 3a and 3b, there are two similar, but opposite, gripper assemblies 37 and 38 mounted on the support assembly 34 at spaced locations each of the gripper assemblies include a pivot plate 39 mounted on the support assembly 34 for pivotal movement about its associated axis 41. A plurality of rollers 42 mounted on the pivot plates 39 engage the associated bearing plate 43 on the support assembly 34 to maintain the horizontal position of the pivot plates 39 during their pivotal movement. A centrally located pivotal support assembly holds the pivot plates up so that engagement is maintained between the rollers 42 and the associated bearing plates 43. An actuator 44 is connected between the bearing plate 43 and the pivot plate 39 and is operable to rotate the associated pivot plate through 90 from the position illustrated, to a turned position. This actuator operates to properly position the gripper assembly for gripping the rows in the particular grid being transferred, and also operates to properly position the grids at the release position.

Each of the gripper assemblies 37 and 38 includes a carriage 46 supported by rollers 47 on the associated pivot plate 39 for limited lateral movement between a separated position illustrated in FIG. 3a and a closed position illustrated in FIG. 3b. An actuator 48 is connected between the associated pivot plate 39 and carriage 46 to produce this movement.

A pair of opposed gripper assemblies 51 are supported by each carriage 46 for movement toward and away from each other. An actuator 52 is connected to power the grippers 51 in this movement. Each of the gripper assemblies 51 is provided with gripper pads 53 proportioned to engage the side rows of bricks of a grid. Also mounted on the carriage 46 is a central gripper plate 54 (illustrated in FIG. 4) which cooperates with the gripper pads 53 to grip the rows of a grid.

Figure 4:
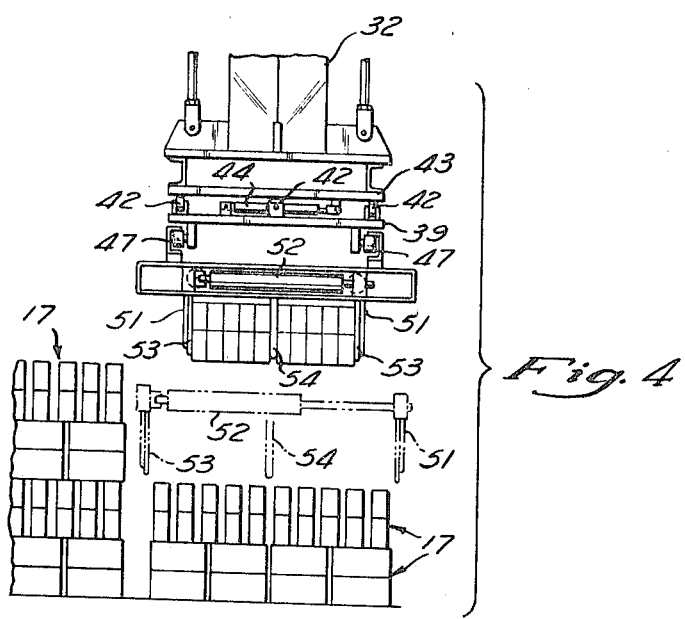
FIG. 4 is a fragmentary side elevation again illustrating the gripper transfer.

As best illustrated in FIG. 4 the gripper pads 53 are movable by the actuator 52 to an extended position illustrated in phantom. In such position the pads can be lowered down along opposite sides of the grid with the center plate 53 movable between the center most double rows. After the pads are positioned on opposite sides of the grid they are moved toward each other causing the bricks to slide inward into a compacted group as illustrated in the full line position. In such a condition the rows abut each other and each gripper pad 53 presses the adjacent bricks into gripping engagement with the center plate 54. The pads 53 are arranged so that they always grip the lower bricks of each superposed row so that the entire grid can be carried by the gripper transfer to a support table 56.

The operation of the gripper transfer is as follows. After depositing a pair of grids on the support table 56 the actuators 52 operate to release the grid. The actuators 36 then lift the entire transfer gripper assembly to the position illustrated in FIG. 1 so that it clears all of the stacks. If the grids to be subsequently gripped are in position with the rows extending lengthwise of the car, the actuators 44 are operated to turn the gripper assemblies to the position illustrated in FIG. 1. The carriage 22 is then moved to one of the gripping stations 26, 27, or 28. Assuming that the grids 17a on the top of the stacks 11a and 11b are to be gripped, the carriage is moved to the gripping position at station 27. During this movement the actuators 48 move the carriages 46 inward toward each other so that they are properly spaced a distance equal to the spacing between the two stacks 11a and 11b.

After the carriage 22 is in position over the grids 17a the actuators 36 extend to position the gripper pads 53 on opposite sides of the grids 17a with the central plate 54 located between the centermost rows. When the grippers are properly positioned the actuators 52 retract causing the gripper pads to move toward each other. This causes the rows of bricks to slide into abutting relationship. In this operation the upper most grid on each of the stacks 11a an 11b are gripped. The actuators 36 then retract to raise the gripped brick to a position high enough to permit traverse back to the release position 23. During such movement the actuators 44 are operated to rotate the grippers and the gripped grids so that the rows of brick in the gripped grids extend parallel to the table 56. During such movement the actuators 48 extend to move the carriages 46 apart to increase the spacing between the gripped brick. After the carriage 22 reaches the release position 23 the actuators 36 extend to position the two grids on the support table 56 at the release position. In the release position the grids are located at 17b and 17c. The various elements are proportioned so that the grids 17b and 17c are spaced apart a distance which is greater than the width of the grid for reasons discussed below.

A puller 61 is mounted on the table 56 for movement from the position illustrated in FIG. 1 toward a powered belt conveyor 62. A chain actuating system 63 is connected to power the puller 61. The puller is adapted to move the grids 17b and 17c to the right as viewed in FIGS. 1 and 2, along the support table 56 to position for transfer to the conveyor 62. A secondary puller 64 is mounted for similar movement along the table and is powered by a chain-type actuator system 66. The second puller 64, however, is pivoted at 67 and is connected to an actuator 68 which can operate to raise the puller plate 69 above the top of the grids being moved along the table by the first puller 61. The support table is mounted for limited movement relative to the frame 71 by an actuator 72.

The second puller 69 after being positioned behind rows of brick at 17d and 17e as illustrated in FIG. 1, moves to the right to position the end most groups 75 of bricks of the two lines onto the conveyor 62. After this occurs, the actuator 72 extends to move the support table 56 back a small amount to insure that the ends of the groups 75 of brick resting on the conveyor 62 are clear of the adjacent bricks on the table. After the bricks positioned on the conveyor are moved away the puller 69 again moves to the right to position the next groups of brick. During this movement, the actuator 7 retracts, and after the next groups of brick are positioned on the conveyor, again extends to provide a clearance. This action is repeated until the puller 69 had moved at least four groups 75 of brick onto the conveyor. The actuator 68 is then retracted to raise the puller plate 69 and the puller is moved to the left as viewed in FIG. 1. The pusher 61 in the meantime, moves the two grids at 17b and 17c to the right so that the last brick is positioned to the right of the puller plate 69. The pusher 61 then returns to the position illustrated to receive the next pair of grids and the actuator 68 is extended to lower the puller plate 69 behind the grids.

In the embodiment illustrated in FIGS. 1 through 4, the groups 75 of brick positioned on the conveyor 62 by the puller 69 consist of pairs of superposed brick. While the superposed brick rests on the conveyor, before the conveyor moves them away, an inverter operates to remove the upper layer of bricks of each superposed pair and places such upper layer in an inverted position on a second support table 76. There are two structurally similar inverts 77 and 78. The inverter 77 is associated with the bricks in alignment with the grid at 17d and the inverter 78 is in alignment with the bricks in the grid 17e.

Each of the inverters includes a pair of arms 81 and 82 mounted on an associated pivot shaft 83. The pivot shaft is rotatable by an actuator 84 between the full line position in FIGS. 2 and 3 an a position substantially 180° of rotation therefrom. Mounted on the end of each inverter arm 81 and 82 is a clamping actuator 86 and 87, respectively. Each actuator is provided with a brick-engaging pad 88 arranged to engage the upper most brick at the end of each group of bricks on the conveyor 62. The gripping pads are operable by their associated actuators to clamp and grip the upper layer of brick of each group 75 and after gripping, the inverter transports the brick to a position 91 where the brick is deposited on the second support table 75. A pusher 92 is then operable by an actuator 93 to move the groups of brick back toward the conveyor.

It should be noted that the inverter 78 is provided with longer arms 81 and 82 than the inverter 77 so that more brick are located between its pusher 92 and the conveyor, than between the pusher 92 of the inverter 77 and the conveyor. This arrangement provides additional blending as will be described in detail below.

The operation of the inverter and the conveyor is substantially as follows. After two groups of brick 75 and 75a are positioned on the conveyor 62 by the puller 64, the two inverters 77 and 78 grip the upper layer of bricks of each group 75 and 75a an carry these upper bricks to the positions 91 and 91a. The conveyor then moves the lower bricks of each of the groups lengthwise of the conveyor in the direction of the arrow 99 until the lower layer of the group 75 is positioned between the two lines of brick, and the lower layer of the group 75a is clear of the adjacent line of brick. Because the two lines of brick are spaced apart a distance greater than the length of each group 75 and 75a, it is possible to position the lower layer of the group 75 between the two lines. The pushers 92 are then operated to push the forward most group 101 and 102 of the two lines on the table 76 forward onto the conveyor. Here again, the table 76 is movable by an actuator 103 to a retracted position after the forward most group is positioned on the conveyor to provide clearance between adjacent brick. The conveyor then operates to move the groups away from the conveyor-loading positions and subsequent double layered groups are moved by the puller 64 onto the conveyor and the cycle is repeated.

Because more groups of brick are located between the pusher 92 of the inverter 78 and the conveyor than are located between pusher 92 of the inverter 77 and the conveyor, a blending is provided since a particular group of bricks acted upon by the inverter 78 is spaced further from the group it originally rested on than the groups handled by the inverter 77. However, both inverters perform a blending since the upper layer of each superposed group is spaced from its associated lower layer by intermediate groups before it reaches the conveyor. Therefore, the inverting subsystem functions to blend groups of brick This blending is achieved since the release position 91 is spaced further from conveyor than the inverter gripping position.

A gripper transfer also performs a blending operation which can be arranged to provide any desired blend of bricks from different stacks. For example, if it is desired to blend bricks of one color or texture with bricks of another color or texture, the kiln cars 10 through 12 are supplied to the machine with stacks of the desired types of brick. For example, the stacks on the kiln car 10 may be of a first color or texture, the stacks on the kiln car 11 may be formed of brick of a second color or texture, and the stacks on the kiln car 12 may be formed of bricks of a third color or texture. If a blend is desired wherein substantially equal numbers of bricks of each color and texture are desired in the ultimate package, the transfer is programmed to remove a pair of grids from one kiln car and in the next two cycles of operation to remove bricks from the other two kiln cars. In this way, the unloader transfer operates to mix or blend three different types of brick so that the ultimate package contains substantially equal percentages of each type of brick. If, on the other hand, equal blending is is not desired, the machine can be programmed to remove grids from the kiln car 12 twice as often as it removes grids from the cars 10 an 11. With such an arrangement, the resulting package would contain a blend consisting of about half bricks of the type located on the kiln car 12 and one-quarter of each of the types located on the kiln car 10 and 11. It should be understood that other blends could be obtained by other programs of unloading and that these two blends are described only by way of example. It should also be understood that the machine can be arranged to provide more or less numbers of pickup stations.

It should be understood that machines incorporating this invention can be arranged to unload grids consisting of greater or lesser numbers of rows and greater or lesser numbers of brick in each row. In order to simplify the understanding of this invention, the control circuitry for operating the various actuators and power operated devices are not illustrated since it is well within the skill of a person skilled in the art to arrange a circuit to provide a particular mode of operation. Similarly, the controlling switches and valves are not illustrated for the same reason.

FIG. 5 discloses a modified form of inverter. In this embodiment most of the environmental parts are similar to the first embodiment so similar reference numerals will be used to refer to similar parts, but a prime is added to indicate that reference is made to the second embodiment.

In the embodiment of FIG. 5 each inverter 77' and 78' is provided with gripper pads 88' proportioned to simultaneously grip the upper layer of bricks of two adjacent groups for transfer from the first table 56' to the second support table 76'. Since two groups of brick are gripped, the various elements are proportioned so that the gripping is of the forward most two groups still remaining on the table 56'. Consequently, the arms 81' and 82' are proportioned to extend across the conveyor 62'. With this embodiment the inverter operates with the cyclic speed which is one-half of the cyclic operating speed of the puller 64' and pusher 92'. Since the upper brick of each pair are removed before the pair reaches the conveyor, the conveyor need not be held stationary for gripping by the inverter. This embodiment in some instances permits higher machine operating speeds.

Although preferred embodiments of this invention are illustrated, it is to be understood that various modifications and rearrangements may be resorted to without departing from the scope of the invention disclosed.

What is claimed is:

1. An unloader blender for progressively removing articles such as bricks or the like from a plurality of stacks of articles wherein each stack includes a plurality of grids positioned one on top of another and each grid includes a plurality of groups of articles comprising a plurality of separate kiln cars or the like each providing first support means, said kiln cars being separately operable to move horizontally into one of a plurality of unloading stations with said support means cooperating to separately support at least one stack at each unloading station without substantial vertical movement of said stacks, second support means spaced from said unloading stations, first powered transfer means operable to sequentially grip grids at the top of said stacks, transfer them to said second support means and position them on said second support means in a predetermined orientation and position, said first transfer means being operable through repeated cycles wherein one grid is removed from a first stack on a first support means and a subsequent grid is removed from another stack on another support means before the grid below said one grid is removed from said first stack, conveyor means operable to receive articles and transport said articles in at least one line of abutting articles to a subsequent operation, and said second support means including transfer and blending means operable to transfer to said conveyor means groups of articles and form on said conveyor means a blended line of articles consisting of adjacent groups some of which are from the same grid but which were not adjacent to each other in said same grid.

2. An unloader blender as set forth in claim 1 wherein said first stack is formed of articles having first similar physical properties, and said another stack is formed of articles having second similar physical properties which are different than said first physical properties, and said first transfer means operates to grip grids from selected stacks and deliver articles to said second support means in a blend containing a predetermined ratio between the number of articles from said first stack and the number of articles from said another stack.

3. An unloader blender as set forth in claim 1 wherein at least one stack is located between said second support means and a second stack, and said first transfer means is movable between said release station and the position for gripping grids at said second stack without interference from said one stack.

4. An unloader blender as set forth in claim 3 wherein a carriage is horizontally movable between said stations, and said first transfer includes a vertically movable gripper frame carried by said carriage, and power means operable to raise and lower said gripper frame, said power means being operable to raise said gripper frame sufficiently high to clear all of said stacks.

5. An unloader blender as set forth in claim 1 wherein each grid includes a lower layer of articles and an upper layer of articles resting on the associated lower layer, and said second transfer means is operable to remove each upper layer from its associated lower layer.

6. An unloader blender as set forth in claim 1 wherein said second transfer means includes conveyor means operable to transport articles from said machine, each grid includes a lower layer of articles and an upper layer of articles resting on the associated lower layer, and said second transfer means includes destacker means operable to remove each upper layer from its lower layer and deliver articles from said upper and lower layers to said conveyor means as a single layer.

7. An unloader blender for progressively removing articles such as bricks or the like from a plurality of stacks of articles wherein each stack includes a plurality of grids positioned one on top of another and each grid includes a plurality of articles arranged in a predetermined pattern comprising a platform spaced from said stacks, first power-operated transfer means operable to sequentially grip grids at the top of said stacks, transfer them to said platform and position them on said platform in a predetermined orientation, and second power-operated transfer means operable to progressively remove articles from said platform, said platform, said first transfer means being operable through repeated cycles wherein one grid is removed from a first stack and a subsequent grid is removed from another stack before the grid below said one grid is removed from said first stack, said second transfer means including a single conveyor operable to transport articles from said machine, each grid including a lower layer of articles and an upper layer of articles resting on the associated lower layer, and said second transfer means includes destacker means operable to remove each upper layer from its lower layer and deliver articles from both said upper and lower layers to said conveyor as a single layer.

8. An unloader blender as set forth in claim 7 wherein said second transfer means operates to blend articles delivered to said single conveyor.

9. An unloader blender as set forth in claim 8 wherein said second transfer means operates to position groups of abutting articles from said upper and lower layers respectively on said single conveyor, said second transfer means blending said articles by delivering said groups so that a group formed of lower articles is spaced along said single conveyor from a corresponding group of upper articles and other groups are interposed therebetween.

10. An unloader blender for progressively removing bricks from a plurality of stacks of articles wherein each stack includes a plurality of grids positioned one on top of another and each grid includes a plurality of articles arranged in a predetermined pattern comprising a platform spaced from said stacks, first power-operated transfer means operable to sequentially grip grids at the top of said stacks, transfer them to said platform and position them on said platform in a predetermined orientation, and second power-operated transfer means operable to progressively remove articles from said platform, said first transfer means being operable through repeated cycles wherein one grid is removed from a first stack and a subsequent grid is removed from another stack before the grid below said one grid is removed from said first stack, each grid includes a plurality of double superposed rows of aligned brick, said first transfer is operable to simultaneously grip two grids, one from each of two stacks and releases such grids on said platform at spaced locations with the rows of each grid abutting each other and extending parallel to the rows of the other grids, the spacing between said grids on said platform being greater than the width of said grids in a direction perpendicular to said rows; and said second transfer means includes a conveyor extending substantially perpendicular to said rows, and destacking means operable to remove groups of brick consisting of the upper bricks of the superposed rows from the adjacent lower bricks in said rows and positions such groups on said conveyor between similar groups consisting of the lower bricks of said superposed rows.

11. An unloader blender as set forth in claim 10 wherein the spacing between said two stacks is less than the spacing between said grids positioned on said platform, and said first transfer means includes separator means to move the gripped grids apart before positioning them on said platform.

PO-1050
(5/69)

UNITED STATES PATENT OFFICE
CERTIFICATE OF CORRECTION

Patent No. 3,601,266           Dated August 24, 1971

Inventor(s) Florentin J. Pearne, Frank S. Pearne, Frederick G. Robson

It is certified that error appears in the above-identified patent and that said Letters Patent are hereby corrected as shown below:

Column 1, line 39, cancel "of".
Column 2, line 57, "car" should be -- cars -- .
Column 3, line 28, a period (.) should appear after "locations".
Column 3, line 28, "each" should be -- Each -- .
Column 3, line 39, "90" should be -- 90° -- .
Column 4, line 19 "an" should be -- and -- .
Column 4, line 58, "7" should be -- 72 -- .
Column 5, line 2, "inverts" should be -- inverters -- .
Column 5, line 31, "an" should be -- and -- .
Column 5, line 61, -- the -- should appear after "from" and before "conveyor".
Column 6, line 5, cancel "is" as it appears twice.
Column 6, line 7, "an" should be -- and -- .

Claim 7, line 50, cancel "said platform" (second occurrence) as it appears twice.

Signed and sealed this 16th day of May 1972.

(SEAL)
Attest:

EDWARD M. FLETCHER, JR.
Attesting Officer

ROBERT GOTTSCHALK
Commissioner of Patents